(No Model.) 2 Sheets—Sheet 1.
F. H. DAVIS.
CORE BORING APPARATUS AND MEANS FOR GRIPPING AND RAISING CORES.
No. 555,640. Patented Mar. 3, 1896.
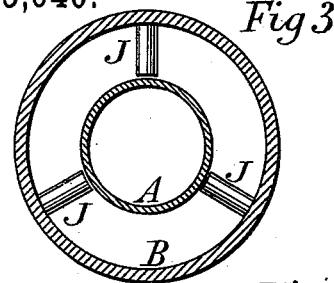
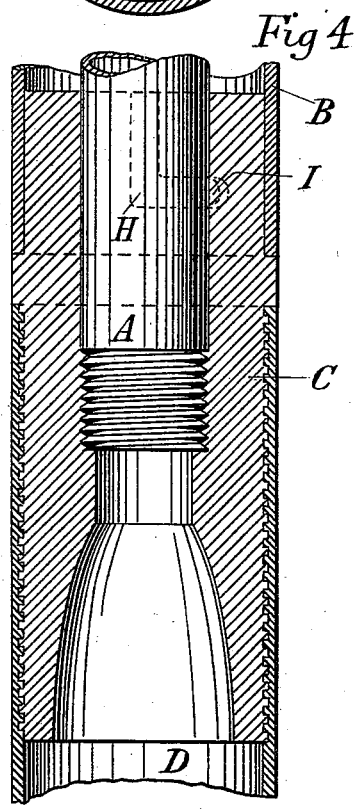
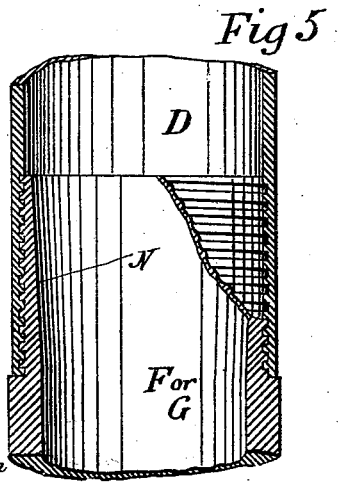
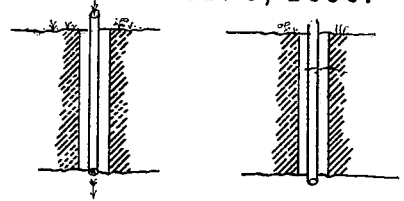
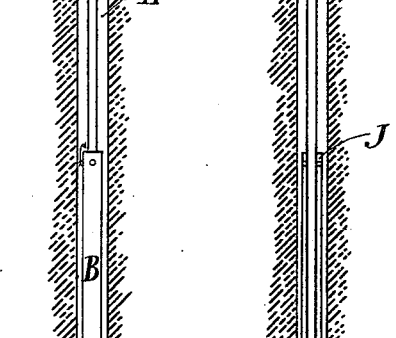
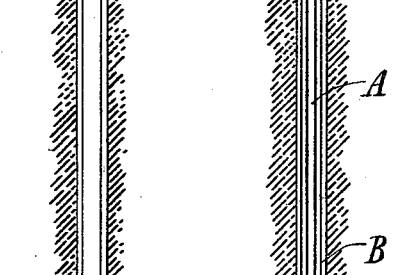
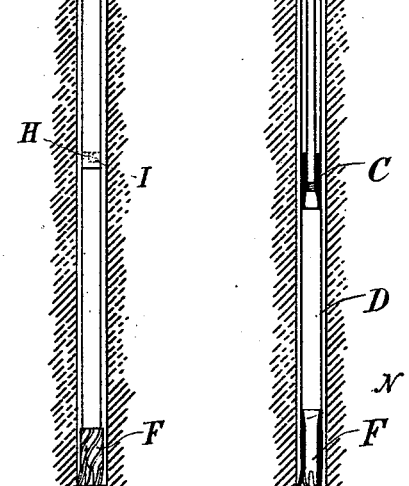
Fig 1. Fig 2.
Witnesses
A. C. Pfaff
E. C. Dephure
Inventor
Francis Harley Davis.

(No Model.) 2 Sheets—Sheet 2.

F. H. DAVIS.
CORE BORING APPARATUS AND MEANS FOR GRIPPING AND RAISING CORES.

No. 555,640. Patented Mar. 3, 1896.

Witnesses:
a. c. Pfaff.
E. C. Deghuee

Inventor:
Francis Harley Davis.

UNITED STATES PATENT OFFICE.

FRANCIS HARLEY DAVIS, OF MELBOURNE, VICTORIA.

CORE-BORING APPARATUS AND MEANS FOR GRIPPING AND RAISING CORES.

SPECIFICATION forming part of Letters Patent No. 555,640, dated March 3, 1896.

Application filed January 28, 1895. Serial No. 536,458. (No model.) Patented in Victoria August 19, 1893, No. 10,747, and in Western Australia September 12, 1894, No. 526.

*To all whom it may concern:*

Be it known that I, FRANCIS HARLEY DAVIS, a subject of the Queen of Great Britain and Ireland, and a resident of Melbourne, in the Colony of Victoria, have invented a certain new and useful Core-Boring Apparatus and Means for Gripping and Raising Cores Therewith, (patented in Victoria, No. 10,747, dated August 19, 1893, and in Western Australia, by Letters of Registration No. 526, dated September 12, 1894,) of which the following is a specification.

My invention is designed to effect improvements of an important kind in boring machinery, whereby I render practicable much greater economy of working expenses, economy in the cost of the plant employed, and when prospecting or testing country for deep leads or coal measures the securing of a truer and more reliable record of the strata as they are reached than is often arrived at by means of the diamond-drill or other known apparatus. In such apparatus the cores obtained are often very incomplete, large portions having been ground away and washed to the surface, and there is no method of satisfactorily checking such losses and obtaining a correct record of the thickness of seams of coal or other strata pierced.

My improvements are extremely simple, and relate, first, to a set of cutting-tools, (for rock and coal boring, respectively;) secondly, to a chip-cup apparatus for débris, and, thirdly, to a means and apparatus (by introducing sharp fragments of hard rock or the like down the tubing and around the core and by means of a frustum of an inverted cone, which forms the interior upper portion of the cutter) whereby I am able, as hereinafter set forth, without expense or uncertainty, to cause the core to be gripped, broken off, and raised with the rods from time to time, as required.

Figure 6:
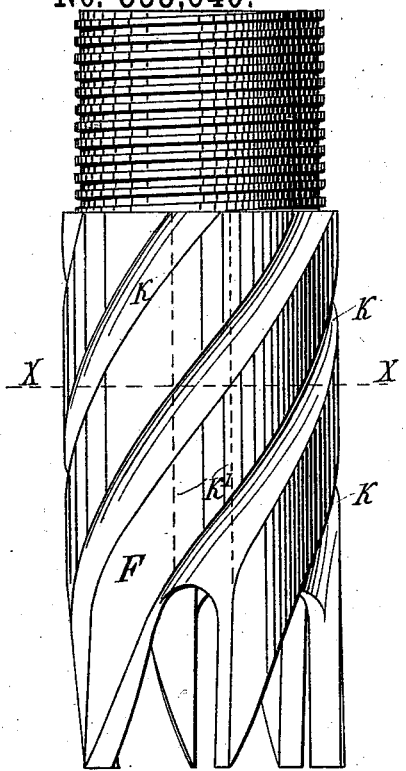
Figure 10:
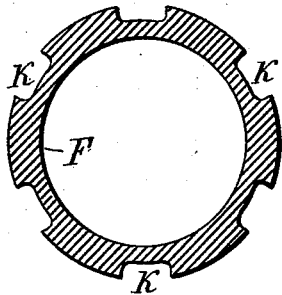
Figure 9:
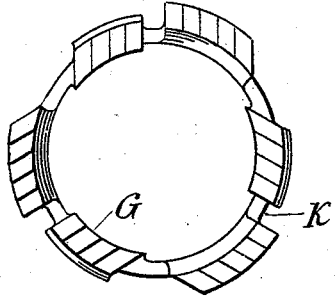

Referring now to the accompanying sheets of drawings, which form a part of this specification, and in which the same letters of reference indicate like parts, Figure 1 shows my apparatus in vertical elevation complete, as it would appear at work boring the earth's strata, the latter being shown in section. Fig. 2 shows, in vertical middle section, the same parts of the apparatus as in Fig. 1. Fig. 3 is a sectional plan of the boring-rod and the chip-cup with its steadying-pins. Fig. 4 is a sectional elevation of the reducing-plug, showing the boring-rod coupled to the same and showing the upper end of the core-barrel and the base of the chip-cup. Fig. 5 is a sectional elevation showing the base of the core-barrel and the frustum of an inverted cone formed in the upper portion of the cutter, which portion is shown screwed into position and reduced in diameter at the threaded portion, so as to leave a shoulder, against which abuts the end of the threaded core-barrel D. Fig. 6 shows my rock-cutter, and Fig. 7 my coal-cutter, both in vertical elevation. Figs. 8 and 9 show, respectively, plan views from below of the said rock and coal cutter. Fig. 10 shows a horizontal section of the rock-cutter on the line X X in Fig. 6.

Referring to the figures, in which Figs. 1 and 2 are upon a smaller scale than the others, A shows a hollow boring-rod and represents the lowermost of the usual series of coupled tubes which extend to the surface and are caused to rotate when boring is in progress.

B shows a novel chip-cup consisting of a plain cylinder or series of connecting cylinders, and located above the core-barrel, so that when in use its base is closed and it forms an annular cup having a certain specific capacity, hereinafter stated.

C is a reducing plug or coupling, part of its length being shown screwed into the upper end of the core-barrel D, or it may be shrunk into and riveted or otherwise secured to the same. This plug has internally a female screw, as shown, into which the lower end of A is screwed home to its seat, as shown. The plug has also a shoulder of the same diameter as the core-barrel, which shoulder prevents the plug going too far down. The base of the chip-cup B is slipped down, (and fits closely over a part of C, which projects above D,) resting on the shoulder aforesaid. There is a bayonet-slot H in the projecting portion of C and an internally-projecting pin I near the base of the cup B, by which these parts are kept locked together when in the bore. The base of the bayonet-slot extends in the reverse direction to that in which the tubes are rotated, so that there is no tendency for the cup to become displaced.

J J J show pins at the upper extremity of the chip-cup serving to keep it with its sides parallel to the boring-rod which passes through it. In F, the rock-cutting bit, there is a series of spiral grooves of wide pitch K K, there being for each cutting-tooth one groove which is not merely a shallow depression to act as a channel for water and finely-divided débris, but is cut deeply, as shown in Fig. 10, so as to allow large chips to ascend and also allow of gulleting the teeth when worn. The spiral grooves are wider near the cutting-edges than near the threaded portion, and the edges of any groove coincide with different edges of the same tooth, whose respective edges are longitudinal and spiral.

My cutter is novel, and by having the teeth in this shape and far apart the action is different from that of ordinary drills.

Instead of pulverizing the rock into very fine parts, my cutter when slowly rotated under great pressure has the effect of removing large flakes which I call "chips." I will again refer to the cutter F in a later part of this specification. In some cases I use vertical grooves K', as shown by dotted lines in Fig. 6, instead of spiral ones.

This apparatus is worked in the usual manner by rotating the series of hollow rods A, and thereby the core-barrel D and the rock or coal cutting bit F or G, water being at the same time forced through the interior of A and D to the bottom of the bore, and where it rises up around the exterior of the tubing, as in the working of diamond-drills, and other hydraulic boring-machines. The water, as it escapes under the gullets of the teeth of the cutter and begins to ascend, carries with it the chips and powdered particles of mineral matter as fast as they are produced by the boring-bit.

Now in all diamond and other hydraulic drilling machinery the whole or almost all of the cuttings or chips are caused to pass with the water up the bore to the surface, and to do this these drills require extremely powerful special steam-pumps when any considerable depth is attained. Thus it is that the cost of drilling at great depths with such drills and the cost of plant, as well as the quantity of water employed, are all excessive. The weight of the rock-cuttings held in the water becomes at length so great that a point may be reached where the influence of gravity cannot be overcome by the process of pumping except at a practically prohibitive expenditure of power. I proceed on totally different principles. I provide that the chips and débris shall never be carried up to the surface by the ascending water, and instead of a powerful steam-pump an ordinary hand-pump suffices for my apparatus, no matter how deep the bore may be, it being essential to avoid having such powerful currents as I have referred to.

The current from my comparatively weak pump does not lift the débris far up the bore, so that water from bores made with my apparatus reaches the surface only slightly loaded with impurities.

I have found that the contrivance B renders my plan a success.

B is a cylinder (preferably a series of connectable cylinders) forming one long annular cup around the lowest boring-rod, and immediately above and of uniform diameter with the core-barrel, and it has this essential characteristic which distinguishes it from all other inventions, and without which it would fail to answer the purpose for which it is used, that it is approximately of such length as to be able to hold all the débris which the cutter removes while filling the core-barrel with core. The object of having disconnectable sections is that they enable the cup to be emptied without trouble when required. This rigid and lengthy cup (in practice reaching with the apparatus I usually employ to a point over forty feet above the cutters, and almost filling the bore for that distance) also serves to keep the whole boring apparatus true to its vertical line, a matter in respect to which other boring apparatus is prone to give some trouble.

Having then provided such a cup which is definitely able to contain all the débris aforesaid, and having a jet of water no more powerful than is necessary to carry the débris above the top of the chip-cup, at which point the speed of the current diminishes on account of the widening of the water-space in the bore, the result is that the chips fall into the cup and fill it in regular order as they are produced, thus making an inversed but accurate record of the strata passed through, and the larger the chips the more promptly they are disposed of by their falling into the cup, whereas in cases where the chips are forced to the surface the larger the chips the greater is the power needed to dispose of them.

When my apparatus is caused to cease boring and there is a length in the core-barrel ready to be drawn, I cease pumping almost immediately, as in two or three minutes the last of the chips will have been lodged in the cup. In the case of the diamond-drill in deep bores the pumping must go on, often for an hour, till the greater part of the débris has been washed out, and even then there is often enough fine mineral matter left in the bore to be a source of trouble under various well-known circumstances. Such is not the case with the apparatus I use, which leaves the bore practically clean and free from débris. As soon as my tubes are drawn I empty the various sections of the chip-cup, keeping the strata in order, and also empty the core-barrel and check the core by the cuttings. If the core is perfect there will be a definite proportion, such as one pound of core to two pounds of cuttings, and the various kind of minerals in both core and cup will closely correspond. Any discrepancy in the core can be detected and the extent calculated by noting to what extent the contents of the core and the cup depart from the proper definite proportions. By noting to what extent the respective contents of cup and barrel depart from these conditions as to kind and quantity it will be known to what extent the cores fail to give a true and complete record of the strata, as happens when one length of core rides or grinds upon another length beneath it.

It will be seen that the rock-cutter F is of peculiar and novel construction, and as it produces large chips would be impracticable in deep-boring apparatus unprovided with my chip-cup. It is composed of a cylindrical piece of steel with large teeth cut in the end, as shown in Fig. 6, these teeth being of sufficient length (about two and one-fourth inches) to make it an easy matter to draw them out and dress them upon an anvil like an ordinary pick-point. When these teeth wear short a portion of the gullet can be cut away, which will renew the length again and again as long as the cylinder shall last. The spiral grooves K or the vertical grooves K' are for a two-fold purpose—viz., to make more clearance for the chips to flow upward and to make the metal lighter to cut out when gulleting. These teeth, which may be any even number, preferably six, but not less, are set in and out alternately like saw-teeth. The inside set cuts the rock so as to leave free passage for the water between the core-barrel and the core, while the outside set cuts clearance for the whole apparatus to work freely and to allow water and chips to ascend to and enter the top of the cup. Thus the spaces between the respective edges of the bore and the core and the cutter form the water-ways referred to.

Figure 7:
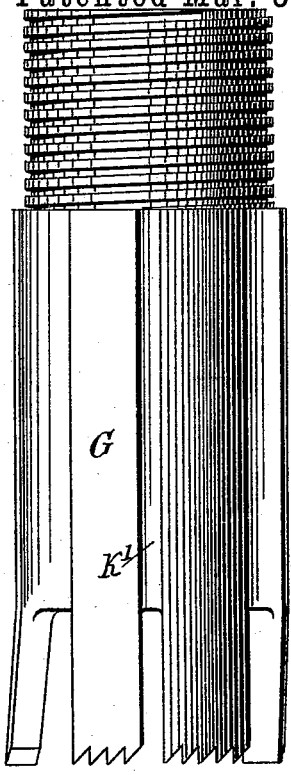
Figure 8:
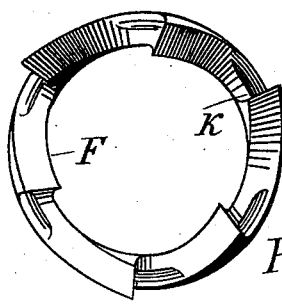

In Fig. 7 a bit G to cut seams of coal is shown, it being a modification of and interchangeable with the rock-cutter F. The machine would not be complete without it, as when coal is reached the coarse teeth of F would fracture the core and destroy it.

G is made of a steel cylinder, the bottom end being cut into six sections set in and out alternately, as already described and as shown in Fig. 7, each section consisting not of one tooth, as in F, but of a number of fine saw-teeth. The slots between the sections allow free egress for the water, being a modification of the gullets in F, and vertical grooves K' in G take the place of the spiral grooves in F.

I have now to describe the simple method by which I break off and raise cores to the surface, and which is applicable to diamond and other drilling apparatus. When the boring has ceased, I preferably take some quartz-rock and crush it to about the size of peas. This produces fragments of great hardness with sharp edges, and these I drop from above down the inside of the coupled tubes A, whereby they fall into the core-barrel D and around the core. According to the sizes and shapes of the fragments they find a bed at different parts within the core-tube, but principally between the core and inversely-coned sides N of the interior of the upper portion of the cutter F or G, at which part the wedging action is most powerful. A revolution or two of the tubing is then sufficient to embed and wedge the edges of the fragments so firmly into the core and between the latter and the barrel and the part N that no other gripping appliance whatever is necessary. By the revolution last named the core is often broken off at the base, but if not it is broken off or torn up by lifting, and the whole of the rods being then raised the core will come up to the surface firmly gripped within its barrel.

In carrying out my said method of gripping and raising cores any suitable substitute for quartz-rock may of course be employed.

By doing without the gripping arrangements hitherto used, and by gripping cores in the manner described by me, I am enabled to avoid the necessity of cutting away a wide annulus around the core, as is done where it is necessary to give clearance for the space required for gripping appliances to work in. The importance of this will be clear, since the less débris there is cut away around the core the faster and cheaper the boring will be done.

The cores from my boring apparatus show great freedom from spiral groovings, the advantage of which is obvious. I procure this result by using heavy pressure and comparatively slow rotation whereby the lashing that produces the groovings is avoided.

What I claim is—

1. A grab for lifting cores or the like consisting of the combination of a tubular cutter whose interior diameter is greater and exterior diameter less above the teeth than at the teeth, a core-barrel D, whose interior diameter exceeds that of the cutter, and communicating with the said cutter by the inversely-conical channel whose surface is N, and a tube A open throughout its length and connected to and communicating with the said core-barrel, as and for the purpose set forth.

2. A grab for lifting cores or the like, consisting of the combination of a tubular cutter whose interior diameter is greater above the teeth than at the teeth, a core-barrel D, whose interior diameter exceeds that of the cutter, and communicating with the said cutter by the inversely-conical channel whose surface is N, and a tube A open throughout its length and connected to and communicating with the said core-barrel, as and for the purpose set forth.

3. A grab for lifting cores or the like, consisting of the combination of a threaded cutter having a channel whose surface is N inclining downwardly and inwardly to the interior bore thereof, and a core-barrel screwed to and communicating with the channel, the inner diameter of the cutter being less than that of the core-barrel, and the said inclined surface expanding from one diameter to the other, and the core-barrel, communicating by a tube A to the top of the boring apparatus, for feeding fragments of hard material from above into and around and throughout the length of the core.

4. In boring machinery, the combination with the cutting-bit of a core-barrel attached thereto, a chip-cup, a reducing-plug joining the core-barrel to the chip-cup and having a shoulder of the same diameter as the core-barrel, and provided with a passage-way between the two, a hollow boring-rod screwed in the reducing-plug, and pins J, at the upper extremity of the chip-cup for keeping the latter with its sides parallel to the boring-rod which passes through it.

5. A cutter formed in a single piece and having a threaded portion, an enlarged portion beyond the threads, a series of parallel spiral grooves widening from the threads to the teeth, the two edges of each groove coinciding with edges of different teeth, one of the edges of any tooth lying parallel to the axis of the cutter and the other edge forming an angle with the first edge.

6. A grab for lifting cores or the like consisting of the combination of a tubular cutter whose interior diameter is greater and exterior diameter less above the teeth than at the teeth, a core-barrel D, whose interior diameter exceeds that of the cutter, and communicating with the said cutter by the inversely-conical channel whose surface is N, a tube A open throughout its length and connected to and communicating with the said core-barrel, and an annular chip-cup closed at its lower end surrounding the said tube A open at its upper end and of less exterior diameter than the exterior diameter of the cutter at the teeth.

In witness whereof I have hereunto set my hand in the presence of two subscribing witnesses.

FRANCIS HARLEY DAVIS.

Witnesses:
 GEO. G. TURIS,
 E. F. NICHOLLS.